United States Patent
Lupke et al.

(10) Patent No.: US 10,279,536 B2
(45) Date of Patent: May 7, 2019

(54) SYSTEM AND METHOD FOR IDENTIFYING THERMAL EXPANSION ISSUES IN A CORRUGATOR

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

(\*) Notice: Subject to any disclaimer, the term of this patent is extended or adjusted under 35 U.S.C. 154(b) by 246 days.

(21) Appl. No.: 15/353,044

(22) Filed: Nov. 16, 2016

(65) Prior Publication Data
US 2017/0066174 A1 Mar. 9, 2017

Related U.S. Application Data

(63) Continuation of application No. PCT/CA2015/000310, filed on May 15, 2015.

(30) Foreign Application Priority Data

May 20, 2014 (CA) ..................................... 2852557

(51) Int. Cl.
*B29C 53/80* (2006.01)
*B29C 53/30* (2006.01)
(Continued)

(52) U.S. Cl.
CPC .............. *B29C 53/30* (2013.01); *B29C 33/36* (2013.01); *B29C 47/0023* (2013.01);
(Continued)

(58) Field of Classification Search
CPC .................. B29C 53/30; B29C 47/126; B29C 2947/9242; B29L 2023/22; B29D 23/001
(Continued)

(56) References Cited

U.S. PATENT DOCUMENTS 4,021,178 A * 5/1977 Braun ................. B29C 49/0021
425/325
4,439,130 A 3/1984 Dickhut
(Continued)

FOREIGN PATENT DOCUMENTS

| CA | 2419500 | 8/2004 |
| CA | 2461442 | 9/2005 |
| DE | 102007038404 A1 | 2/2009 |

OTHER PUBLICATIONS

ISA/CA, International Search Report and Written Opinion for PCT/CA2015/000310, dated Jul. 27, 2015.
(Continued)

*Primary Examiner* — Nahida Sultana
*Assistant Examiner* — Debjani Roy

(57) ABSTRACT

Pipe corrugators having opposed series of pushed mold blocks forming a moving mold tunnel are subject to significant thermal expansion and are designed with a thermal expansion gap. The present invention provides a method and apparatus for measuring changes in this expansion gap and preferably recognizing potential thermal issues before serious problems occur. A sensor is provided adjacent a mold block drive that preferably detects a time duration between sensing a trailing portion of a lead mold block and a leading edge of a following mold block separated from the lead mold block by the thermal expansion gap. This time duration in combination with a speed of the pushed mold blocks is used to calculate the size of the thermal expansion gap.

9 Claims, 2 Drawing Sheets

(51) Int. Cl.
*B29C 33/36* (2006.01)
*B29C 47/00* (2006.01)
*B29C 47/12* (2006.01)
*B29C 47/92* (2006.01)
*B29D 23/00* (2006.01)
*B29L 23/00* (2006.01)

(52) U.S. Cl.
CPC ............ *B29C 47/126* (2013.01); *B29C 47/92* (2013.01); *B29C 53/80* (2013.01); *B29C 2947/92066* (2013.01); *B29C 2947/92076* (2013.01); *B29C 2947/92171* (2013.01); *B29C 2947/92209* (2013.01); *B29C 2947/92428* (2013.01); *B29C 2947/92447* (2013.01); *B29C 2947/92561* (2013.01); *B29C 2947/92571* (2013.01); *B29C 2947/92666* (2013.01); *B29C 2947/92704* (2013.01); *B29C 2947/92923* (2013.01); *B29C 2947/92942* (2013.01); *B29D 23/001* (2013.01); *B29L 2023/22* (2013.01)

(58) Field of Classification Search
USPC .................... 264/508, 40; 425/396, 326.1
See application file for complete search history.

(56) References Cited

U.S. PATENT DOCUMENTS

| | | | |
|---|---|---|---|
| 4,869,728 A * | 9/1989 | Sung | C10L 1/221 44/419 |
| 4,988,466 A * | 1/1991 | Jarvenkyla | B29C 47/0033 264/167 |
| 6,719,942 B1 | 4/2004 | Triplett | |
| 7,001,171 B2 * | 2/2006 | Starita | B29C 47/126 425/326.1 |
| 7,691,317 B2 | 4/2010 | Lupke | |
| 2002/0136791 A1 | 9/2002 | Dietrich | |

OTHER PUBLICATIONS

Supplementary European Search Report issued on corresponding EP Patent Application No. EP 15 79 635, dated Oct. 24, 2017.

* cited by examiner

SYSTEM AND METHOD FOR IDENTIFYING THERMAL EXPANSION ISSUES IN A CORRUGATOR

This is a continuation of PCT/CA2015/000310, filed on May 15, 2015 and claiming priority from Canadian Patent Application No. 2,852,557, filed on May 20, 2014.

FIELD OF THE INVENTION

The present application relates to forming equipment having a series of moving mold blocks forming a mold tunnel.

BACKGROUND OF THE INVENTION

Forming equipment having first and second opposed series of mold blocks for forming a moving mold tunnel are well known and used in association with plastic extruders for forming elongate plastic products including tubing, and corrugated plastic pipe. A first series of mold blocks cooperate with an opposed second series of mold blocks to form a moving mold tunnel. The mold blocks effectively circulate between an entrance where the mold blocks engage to form the mold tunnel and an exit of the mold tunnel where the mold blocks separate and are recirculated to the entrance. The first and second series of mold blocks typically circulate as side by side mold blocks or as upper and lower mold blocks.

This type of forming arrangement can be used for extruding pipe and other elongate structures and has particular application for extruding corrugated pipe and double walled corrugated pipe having an inner smooth wall and an outer corrugated wall secured thereto. Other cross sectional shapes can be used and are known.

The demand for both small and large diameter corrugated pipe continues to increase and the speed of manufacture has also increased. Corrugators can now operate at speeds in excess of fifty meters per minute. This increase in speed typically requires a longer mold tunnel and a corresponding increase in the number of mold blocks.

Typically in pipe corrugators, the moving mold blocks are pushed at one end by a drive arrangement for movement along a guide track and it is this drive arrangement that continues to push the mold blocks back to the drive arrangement. On the return path at the drive arrangement there is a thermal expansion gap defined between the lead mold block just engaged by the drive arrangement and the following mold block being pushed to the drive arrangement. This thermal expansion gap separates the mold blocks and allows for thermal expansion of the mold blocks caused by the operating temperature of the mold blocks. The amount of thermal expansion is also a function of the cooling efficiency of the one or more cooling arrangements associated with each of the series of mold blocks.

The present invention will be described with respect to a first series of mold blocks and an associated lower second series of mold blocks (vertical layout), however it can be appreciated that this type of equipment can be of a horizontal or other angular layout of opposed series of mold blocks.

SUMMARY OF THE INVENTION

A pipe corrugator according to the present invention has a first series of pushed mold blocks that cooperate and abut with an opposed second series of pushed mold blocks to define a corrugated mold tunnel between abutting mold blocks of the first and second series of mold blocks. The first and second series of mold blocks separate from each other at an exit of the mold tunnel and are pushed along to return path and brought into abutments with opposed mold blocks adjacent to an entrance of the mold tunnel. Each series of mold blocks include a variable speed mold block drive that engages a lead mold block that is pushed to the mold block drive and separates the lead mold block from an adjacent following returning mold block, creating a thermal expansion gap therebetween. Each series of mold blocks includes a processing arrangement comprising a sensor for sensing the movement of a lead mold block engaged by the variable speed mold block drive from a following mold block about to be engaged by the variable speed mold block drive and separated from the lead mold block by the thermal expansion gap. Means for sensing the speed of the pushed mold blocks is provided and based on the sensed speed assessing the size of the thermal expansion pap.

In an aspect of the invention the sensor for sensing movement of the mold blocks is an edge sensing arrangement that provides information corresponding to the time required for the edge sensor to detect the lead edge of the following mold block.

In a preferred aspect of the invention a processor is provided that uses the time information and the sensed speed to output a distance calculation of the thermal expansion gap.

According to an aspect of the invention, the processor produces an operator alarm indication if the measured thermal gap is less than a predetermined minimum value. In addition, the processor preferably produces an operator alarm indication if the measured thermal gap exceeds a predetermined maximum value.

In a further aspect of the invention, a controller for a variable cooling arrangement for the mold blocks is provided, and the controller receives a signal from the processor to increase the variable cooling arrangement if the measured thermal gap is less than the predetermined minimum value.

In an aspect of the invention a controller is proved for an automatic length adjustment arrangement of the pipe corrugator. The controller receives a signal from the processor to increase the length of the pipe corrugator if the measured thermal gap is less than the predetermined minimum value.

According to an aspect of the invention an automatic length adjustment arrangement and controller for adjusting the length of the pipe corrugator are provided, and the controller maintains the thermal expansion gap within a specified range.

In an aspect of the invention the controller is in communication with the processor and the processor produces a signal and communicates the signal to the controller to decrease the length of the pipe corrugator if the measured thermal gap is greater than a predetermined maximum value.

The present invention also includes a method for use in a pipe corrugator having abutting circulating mold blocks pushed by a drive arrangement along a drive path and returned to the drive arrangement to define a thermal expansion gap between two adjacent mold blocks positioned at the drive arrangement. The lead mold block of the two adjacent mold blocks is in engagement with the drive arrangement and a following mold block is separated from the lead mold block by the thermal expansion gap. The method comprises sensing the speed of the mold blocks when pushed along the drive path, sensing a time duration for the following mold block to move through the thermal expansion gap and be engaged by the drive arrangement, and based on the sensed speed and sensed time duration determining a size of the thermal expansion gap and providing at least an operator indication display of the determined size of the thermal expansion gap.

In an aspect of the invention, the method includes providing an alarm signal if the determined size of the thermal expansion gap is less than a predetermined minimum value.

Preferably an alarm signal is also provided if the determined size of the thermal expansion gap is greater than a predetermined maximum value.

In yet a further aspect of the invention the pipe corrugator includes a variable cooling arrangement for removing heat from the mold blocks, and the method further includes varying the variable cooling arrangement in accordance with the determined size of the thermal expansion gap to remove heat from the mold blocks if the determined size of the thermal expansion gap is below a predetermined minimum value.

In an aspect of the invention, the pipe corrugator includes a variable adjustment arrangement for increasing or decreasing the length of the corrugator and thereby changing the thermal expansion gap. The method further includes automatically varying the variable adjustment arrangement in accordance with the determined size of the thermal expansion gap to increase the length of the pipe corrugator if the determined size of the thermal expansion gap is below a predetermined minimum value. Preferably the method also includes automatically varying the variable adjustment arrangement in accordance with the determined size of the thermal expansion gap to decrease the length of the pipe corrugator if the determined size of the thermal expansion gap exceeds a predetermined maximum value.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
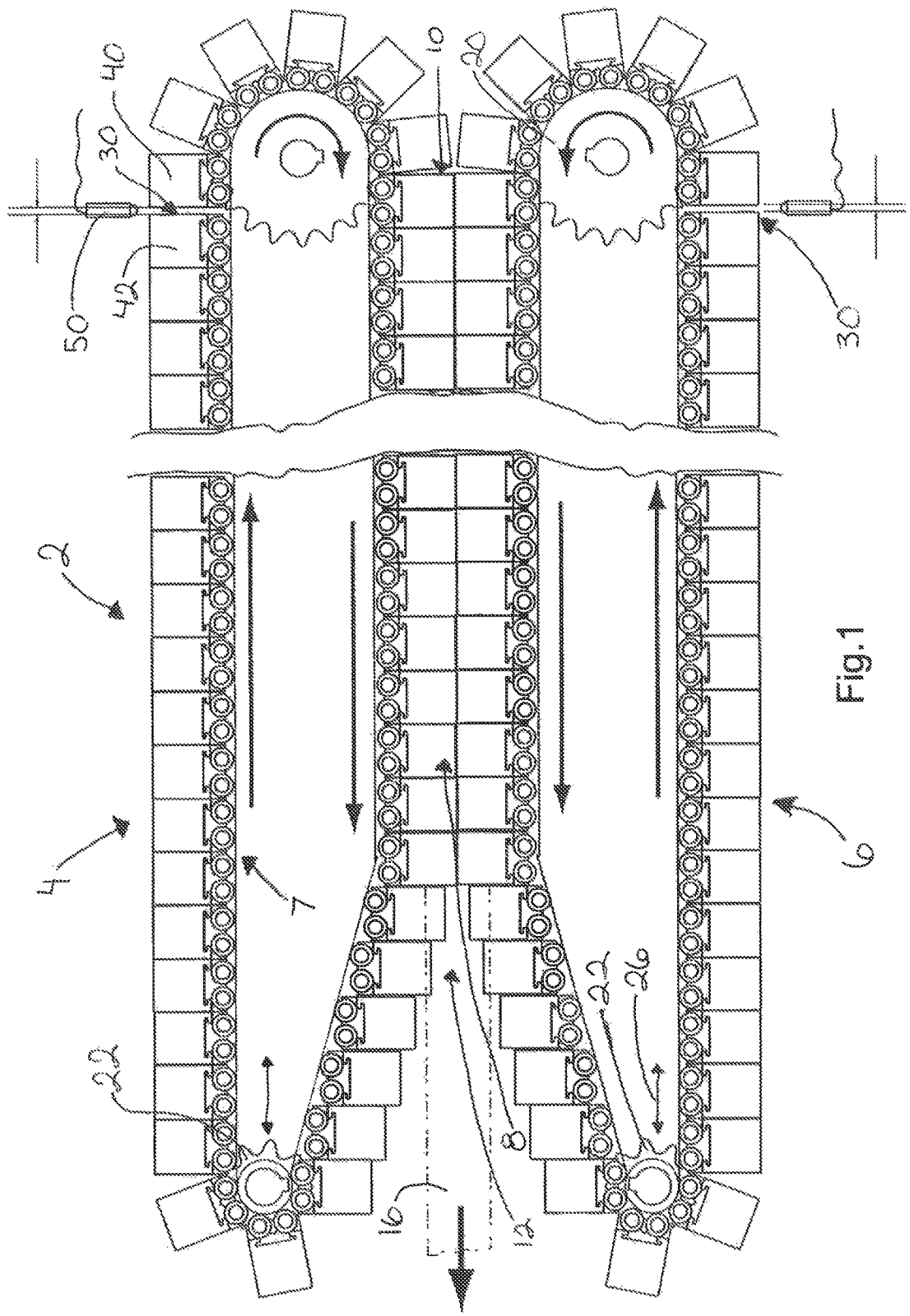
FIG. 1 is a vertical view of a first series of mold blocks and an associated opposed second series of mold blocks forming a moving mold tunnel.

The pipe corrugator forming arrangement 2 includes a first series of circulating mold blocks 4 being independently driven by the drive arrangement 20. There is a second series of circulating mold blocks 6, located below the first series that cooperate with the first series and form the moving mold tunnel 8 having an entrance 10 and an exit 12. The moving mold tunnel 8 is formed by the abutting mold blocks of the first and second series and the abutted mold blocks move with the extruded product until it has sufficiently cooled. The mold blocks separate at the exit 12 of the mold tunnel and at this point the plastic has sufficiently cooled to maintain the molded shape. An elongate extruded product 16 is shown and typically this will be a pipe, a corrugated pipe or various specialty corrugated type products.

The drive arrangement 20 with respect to the first series of mold blocks 4 pushes the mold blocks through the mold tunnel to advance with the product and continues to push the mold blocks back to the drive arrangement 20. The idler gear 22 engages and returns the mold blocks along path 7 to the drive arrangement 20.

A lead mold block 40 has been engaged by the drive arrangement 20 and is advanced and separated from the pushed following mold block 42. A thermal expansion gap 30 exists between the lead mold block 40 and the following mold block 42 as indicated in FIG. 1. A similar arrangement is found with respect to the second series of mold blocks.

A mold block edge sensor 50 is used to provide information with respect to the size of the thermal expansion gap. The block edge sensor 50 detects the trailing edge of the lead mold block and subsequently detects the forward edge of the following mold block. The time duration between these detections in combination with a sensed speed of the drive arrangement or the pushed mold blocks, allows an assessment or calculation of the size of the thermal expansion gap 30.

The thermal expansion gap 30 will change according to the operating temperature of the corrugator, and in particular the operating temperature of the mold blocks. These mold blocks undergo thermal expansion and it is necessary to have an expansion gap to provide a safety buffer. As the size (length) of the corrugator and the number of mold block increases the thermal expansion gap can quickly close. The inventor has recognized it is desirable to sense or monitor the thermal expansion gap and confirm that thermal expansion of the mold blocks has not eliminated this buffer region. Elimination of this buffer will cause binding or locking of the corrugator. Such an occurrence can lead to substantial damage of the equipment, lost production time, lost or scrapped product and possible personnel danger.

These corrugators include various arrangements for adjusting the length of the corrugator and in this way it is possible for the operator to initially set the thermal expansion gap to a desired value and the length of the corrugator can be adjusted if necessary as the forming arrangement comes up to operating temperature. One such adjusting mechanism is generally shown as 26 where the length of the corrugator is adjusted by adjustment of the position of the idler sprocket 22. Other adjusting mechanisms are well known and can be used.

These forming arrangements also include one or more cooling arrangements that circulate cooing fluid through the mold blocks, preferably a cooling air through the mold blocks. Supplementary cooling associated with the return path of the mold blocks is commonly used. The cooling of the mold blocks can also be adjusted if the thermal expansion gap becomes too small in an effort to reduce the operating temperature and reduce thermal expansion of the mold block that is reducing the size of the thermal expansion gap.

With smaller corrugators the expansion gap and dynamic changes in the gap is less pronounced. Typically the cap can be set and the need to adjust during operation was not frequent. With larger corrugators and higher speed corrugators this is not the case.

Although the trailing edge sensor 50 detects the trailing edge of the first mold block and a leading edge of a following mold block it is desirable to also receive the speed of the mold blocks to determine the actual size of the thermal expansion gap. Various different arrangements can be used for tracking the speed of the power drive arrangement and thus the speed of the mold blocks as they are advanced is known. Other arrangements for determining the speed of the mold blocks as they are pushed through the moving mold tunnel can be used.

Figure 2:
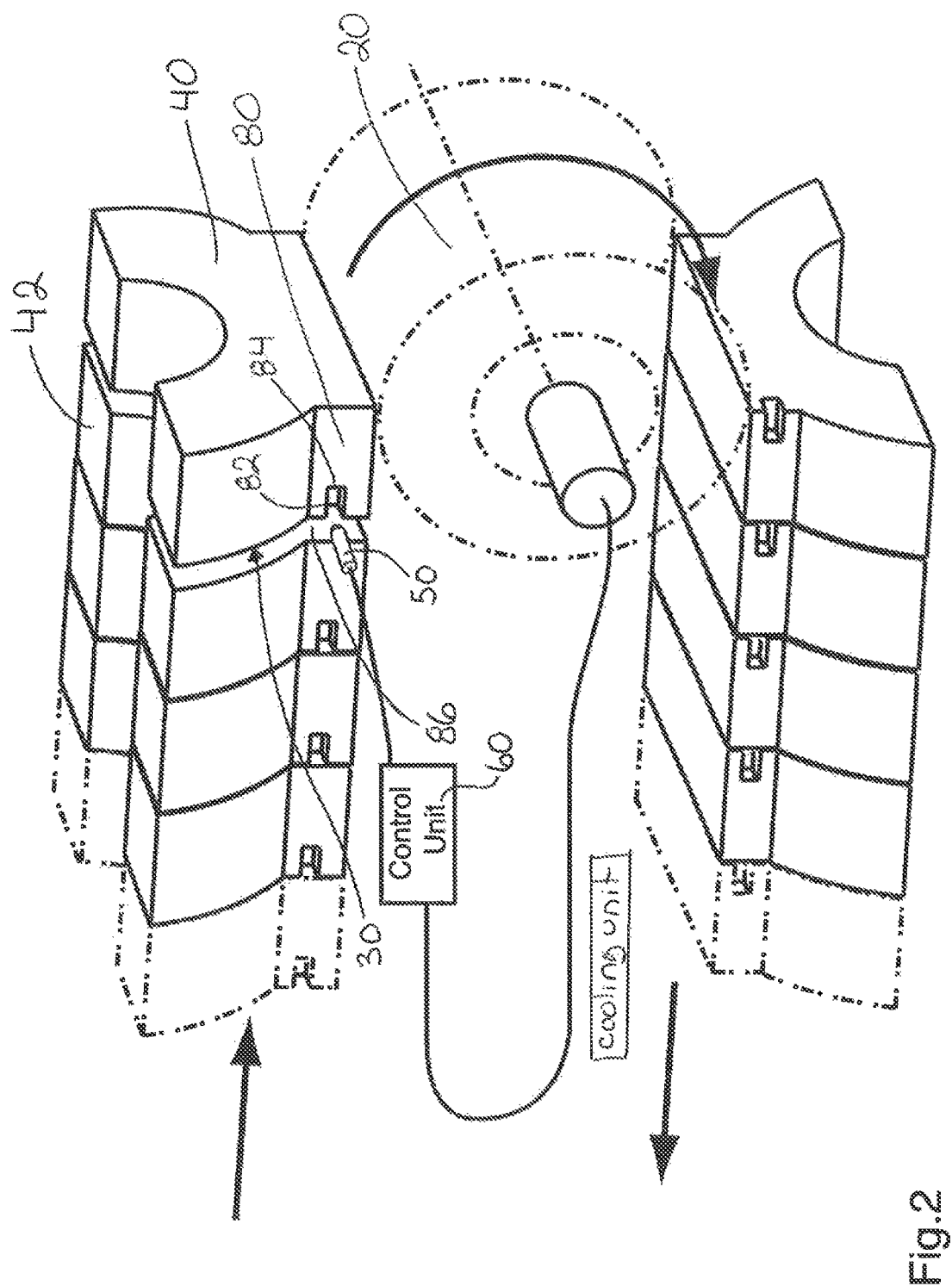
FIG. 2 is a partial perspective view of the mold and the thermal expansion gap that is being measured as part of an operating parameter of the forming arrangement.

FIG. 2 shows some additional details where the lead mold block 40 has been engaged by the power drive arrangement 20 and has separated from the following mold block 42. This creates a thermal expansion gap that is shown as 30. The mold blocks to the lower side of the power drive arrangement 20 are all being pushed to form the mold tunnel and similarly the mold blocks in contact with the following mold block 42 are also in abutment and are being pushed by the drive arrangement 20. FIG. 2 shows the control unit 60 which is receiving a signal regarding the speed of the power drive arrangement 20 and also the sensed edges of the mold blocks via the mold block edge sensor 50. The speed of the mold blocks in combination with the time between the detected edges of the mold blocks allows for determination of the actual size of the thermal expansion gap 30. This gap is monitored by the operator and the gap may be adjusted by altering the length of the corrugator to ensure that a minimum thermal expansion gap is present and/or adjusting the cooling of the mold blocks.

For higher speed forming arrangements there may be a very short time duration between edge sensor 50 sensing the trailing edge of the lead mold block and the leading edge of the following mold block. This can result in significant variations in the sensed thermal expansion gap. To overcome this possible measurement error the mold blocks have been altered at the mold block base 80 to include a sensing recess 82 on the trailing edge of the mold blocks. With this arrangement the sensor 50 will first detect the mold block edge 84 of the lead mold block and the leading edge 86 of the following mold block 42. The sensing recess 82 provides for more time between sensing of the trailing edge 84 and the leading edge 86. The length of the recess 82 is known and therefore the control unit 60 can accurately provide an assessment of the thermal expansion gap 30.

The present system has been described with respect to sensing of the thermal expansion gap in a series of mold blocks and typically a signal or digital number will be provided to the operator such that he has a knowledge of this gap. It is also possible to use this signal to automatically adjust the length of the forming arrangement such that a desired thermal expansion gap is maintained. This signal in combination with a lengthening or shortening of the corrugator can be used to maintain desired operating parameters. It is also possible, as the arrangement detects a reduction in the thermal expansion gap, to increase the mold block cooling function to lower the thermal temperature of the mold blocks and thus return the thermal expansion gap to a more acceptable level.

Although the sensing of the thermal gap can be used for automatic adjustment of the corrugator, it is also possible to use this signal to produce one or more alarm indications that the thermal expansion gap is becoming too small and/or may be becoming too great.

With an extruded product, it is necessary that the mold blocks continue to move with the product as it is extruded. The mold blocks allow forming of the product and reduce the temperature of the extruded material to set the plastic before the mold blocks are separated.

It can be appreciated that a number of different variations of this system can be used, all of which take advantage of the detection of the thermal expansion gap and the use thereof to ensure that the forming arrangement is operating in a desired manner and within a desired operating configuration.

Although various preferred embodiments of the present invention have been described herein in detail, it will be appreciated by those skilled in the art, that variations may be made thereto without departing from the invention as claimed.

The embodiments of the invention in which an exclusive property or privilege is claimed are defined as follows:

1. A pipe corrugator having a first series of pushed mold blocks that cooperate and abut with an opposed second series of pushed mold blocks to define a corrugated mold tunnel between abutting mold blocks of said first and second series of mold blocks;
    said first and second series of mold blocks separating from each other at an exit of said mold tunnel and pushed along a return path to be brought into abutments with opposed mold blocks adjacent to an entry of said mold tunnel;
    each of said series of mold blocks include a variable speed mold block drive that engages a lead mold block that is pushed to said mold block drive and separates the lead mold block from an adjacent following returning mold block creating a thermal expansion gap between said lead and following mold blocks; and wherein
    each series of mold blocks includes a processing arrangement comprising a sensor for sensing the movement of a lead mold block engaged by said variable speed mold block drive from a following mold block about to be engaged by said variable speed mold block drive and separated from said lead mold block by said thermal expansion gap, each processing arrangement assessing the size respective of said thermal expansion gap and providing an operator output signal reflective of the measured thermal gap.

2. A pipe corrugator as claimed in claim 1 wherein said sensor for sensing movement of said mold blocks is an edge sensing arrangement that provides information corresponding to the time required for the edge sensor to detect the lead edge of the following mold block.

3. A pipe corrugator as claimed in claim 2 each processor arrangement that uses said time information and said sensed speed to output a distance calculation of said thermal expansion gap.

4. A pipe corrugator as claimed in claim 3 wherein said processor arrangement produces an operator alarm indication if the measured thermal expansion gap is less than a predetermined minimum value.

5. A pipe corrugator as claimed in claim 4 wherein said processor arrangement produces an operator alarm indication if the measured thermal expansion gap exceeds a predetermined maximum value.

6. A pipe corrugator as claimed in claim 4 including a controller for a variable cooling arrangement for said mold blocks, and said controller receives a signal from one of said processor arrangements to increase said variable cooling arrangement if the measured thermal expansion gap is less than said predetermined minimum value.

7. A pipe corrugator as claimed in claim 4 including a controller for an automatic length adjustment arrangement of said pipe corrugator, and said controller receives a signal from one of said processor arrangements to increase said length of said pipe corrugator if the measured thermal expansion gap is less than said predetermined minimum value.

8. A pipe corrugator as claimed in claim 3 including an automatic length adjustment arrangement and controller for adjusting the length of said pipe corrugator, and said controller receives a signal from said processor arrangement to increase said length of said pipe corrugator if the measured thermal expansion gap is less than a predetermined minimum value.

9. A pipe corrugator as claimed in claim 8 wherein said controller is in communication with said processor arrangement and said processor arrangement produces a signal and communicates said signal to said controller to decrease said length of said pipe corrugator if the measured thermal expansion gap is greater than a predetermined maximum value.

* * * * *